(12) United States Patent
Sayre et al.

(10) Patent No.: US 12,319,599 B2
(45) Date of Patent: Jun. 3, 2025

(54) LIQUID PODS FOR RECIRCULATING WATER SYSTEMS

(71) Applicant: BIO-LAB, INC., Lawrenceville, GA (US)

(72) Inventors: Curtis Sayre, Lawrenceville, GA (US); Anjelica Swanson, Lawrenceville, GA (US); John Weber, Lawrenceville, GA (US); Jordan Wooten, Lawrenceville, GA (US)

(73) Assignee: BIO-LAB, INC., Lawrenceville, GA (US)

( * ) Notice: Subject to any disclaimer, the term of this patent is extended or adjusted under 35 U.S.C. 154(b) by 554 days.

(21) Appl. No.: 17/632,413

(22) PCT Filed: Aug. 4, 2020

(86) PCT No.: PCT/US2020/044855
§ 371 (c)(1),
(2) Date: Feb. 2, 2022

(87) PCT Pub. No.: WO2021/026133
PCT Pub. Date: Feb. 11, 2021

(65) Prior Publication Data
US 2022/0356089 A1 Nov. 10, 2022

Related U.S. Application Data

(60) Provisional application No. 62/883,146, filed on Aug. 6, 2019.

(51) Int. Cl.
*C02F 1/68* (2023.01)

(52) U.S. Cl.
CPC .......... *C02F 1/686* (2013.01); *C02F 2305/14* (2013.01)

(58) Field of Classification Search
CPC ...... B65D 65/46; C02F 1/5245; C02F 1/5263; C02F 1/56; C02F 1/66; C02F 1/68; C02F 1/686; C02F 1/688; C02F 2103/42; C02F 2305/04; C02F 2305/14
See application file for complete search history.

(56) References Cited

U.S. PATENT DOCUMENTS

| | | | |
|---|---|---|---|
| 6,727,219 B2 | 4/2004 | Buckland et al. |
| 6,787,512 B1 | 9/2004 | Verrall et al. |
| 7,476,325 B2 | 1/2009 | Tufano et al. |
| 8,276,756 B2 | 10/2012 | Denome et al. |
| 9,815,719 B2 | 11/2017 | Sayre et al. |
| 2007/0034575 A1 | 2/2007 | Tufano et al. |
| 2014/0124454 A1 | 5/2014 | Nichols et al. |
| 2017/0355938 A1 | 12/2017 | Lee |
| 2017/0369823 A1 | 12/2017 | Souter et al. |

FOREIGN PATENT DOCUMENTS

| | | |
|---|---|---|
| EP | 1912902 A1 | 4/2008 |
| EP | 2914522 A1 | 9/2015 |
| WO | 2007/021641 A1 | 2/2007 |
| WO | 2014/071240 A1 | 5/2014 |

OTHER PUBLICATIONS

International Search Report and Written Opinion of the International Searching Authority for International Patent Application No. PCT/US2020/044855 mailed Oct. 26, 2020.
"Polyvinyl alcohol", PubChem [retrieved from internet on Oct. 5, 2020, <https://pubchem.ncbi.nlm.nih.gov/compound/Polyvinyl-alcohol>], p. 6.
Extended European Search Report and European search opinion dated May 8, 2023 in Application No. EP20850497.7; 7 pages.
Safety Data Sheet for Brij 58 (polyethylene 20 cetyl ether), 2024 (9 pp).
Safety Data Sheet for Span 40 (sorbitan monopalmitate), 2024 (9 pp).
Safety Data Sheet for Cetyl alcohol, 2024 (10 pp).
Safety Data Sheet for Methyl paraben, 2024 (10 pp).
Safety Data Sheet for Propyl paraben, 2024 (10 pp).
Safety Data Sheet for Propylene glycol, 2024 (10 pp).

*Primary Examiner* — Dirk R Bass
(74) *Attorney, Agent, or Firm* — Merchant & Gould P.C.; Daniel R. Evans

(57) ABSTRACT

Disclosed herein is a liquid pod comprising a liquid composition comprising at least two of a Solvent A, a Solvent B, an Active, a Modifier, and an Adjuvant, wherein the water treatment liquid composition is disposed within a packet comprising a water-soluble polymer film.

9 Claims, No Drawings

LIQUID PODS FOR RECIRCULATING WATER SYSTEMS

This application is a National Stage Application of PCT/US2020/044855, filed on Aug. 4, 2020, which claims priority to U.S. Provisional Patent Application No. 62/883,146, filed Aug. 6, 2019, the disclosures of which is are hereby incorporated by reference herein in their entireties. To the extent appropriate, a claim of priority is made to each of the above disclosed applications.

SUMMARY

Disclosed herein is a liquid pod comprising a liquid composition comprising at least two of a Solvent A, a Solvent B, an Active, a Modifier, and an Adjuvant, wherein the water treatment liquid composition is disposed within a packet comprising a water-soluble polymer film.

BACKGROUND

Recirculating water systems require chemical treatment, which oftentimes include applying to the systems granulated powder or tableted products. However, the chemical treatments may be undesirable for a water system operator. Accordingly, it may be desirable for a water system operator to include chemical treatments within a pod including a plastic film, as the pod limits the operator's exposure to the chemical treatment, the chemical treatment is pre-dosed, and use of the packet is convenient for the operator.

Pool pods including granular and/or powder formulations disposed within a water-soluble plastic have been commercialized. Additionally, pool pods including an oxidizer disposed within a water-soluble plastic are known. See U.S. Pat. Nos. 6,727,219 and 7,476,325. However, these and other pods have several shortcomings that lead to a poor consumer experience. For instance, currently marketed pool pods are granular products disposed within a water-soluble plastic and do not readily disperse/dissolve, sink to pool bottom, and/or promote film failure prior to application. Further, upon application of the pod product to the pool, the operator is often required to take additional steps in facilitating product dispersion/prevention of damage to pool surfaces. A liquid pod may alleviate many of these problems.

Use of liquid household pods is common. See, e.g., U.S. Pat. Nos. 6,787,512 and 8,276,756. A major difference between recirculating water systems (especially pools and the like) and household areas where liquid pods may be applied is the lack of agitation. For example, in a washing machine or a dishwasher, shear/mixing is high, and thus, mixing of the pod liquid component not an issue. In most recirculating water systems, the flow of water is inadequate to mix effectively a viscous solution contained within a liquid pod. Applying chemical pods via the skimmer, where there is more sheer/flow, could possibly expose an operator to a dangerous or an incompatible condition, as many operators use pool sanitizing tablets/oxidizers in the skimmer. Further, as liquid household pods are directed generally towards cleaning, the liquids contained within said pod are typically blends of non-ionic surfactants (sometimes with some solvent), which are liquid at room temperature. Recirculating water chemicals, however, are generally water-soluble solids that are crystalline at room temperature.

In an effort to overcome the shortcomings of the known pool pods, it was desired to develop a liquid pod that meets the following criteria: (i) dissolve water soluble materials commonly used to treat a recirculating water system; (ii) the liquid in the pod does not degrade or dissolve the water soluble film; (iii) maintain control of the liquid pod buoyancy (so that the pod floats/disperses on the surface of the water or sinks/applies to a direct spot on the floor of the body of water); and (iv) be acceptable generally to consumers (i.e., the flash point of the material generally has to be above 140° F.). Liquid pods disclosed and claimed herein having a desired density/buoyancy with a judicious selection of one or more solvents solves many of these problems.

Definitions

The phrase "a" or "an" entity as used herein refers to one or more of that entity; for example, a compound refers to one or more compounds or at least one compound. As such, the terms "a" (or "an"), "one or more", and "at least one" can be used interchangeably herein.

The terms "optional" or "optionally" as used herein means that a subsequently described event or circumstance may but need not occur, and that the description includes instances where the event or circumstance occurs and instances in which it does not.

As used herein, the expression "Solvent A" refers to a non-polar/film compatible solvent that does not dissolve a water-soluble film.

As used herein, the expression "Solvent B" refers to a polar/film incompatible solvent that is capable of dissolving a water-soluble film.

As used herein, the expression "Active" refers to an agent capable of modulating a measurable physicochemical property of recreational water. It is understood that a measurable physicochemical property of recreational water includes, but is not limited to, pH, available chlorine, total chlorine, combined chlorine, total alkalinity, free bromine, turbidity, calcium hardness, a metal (e.g., copper, iron, etc.) concentration, a salt concentration, an algae level, an organic (e.g., oil, dirt, etc.) contaminant, and the like.

As used herein, the expression "Modifier" refers to an agent that capable of changing/effecting a physical property of the liquid composition, such as viscosity, cloud point, flash point, density, specific gravity, etc.

As used herein, the expression "Adjuvant" refers to an agent capable of imparting a desirable cosmetic property to recreational water. It is understood that a desirable cosmetic property of recreational water includes, but is not limited to, color, appearance, clarity, fragrance, and the like.

DETAILED DESCRIPTION

A first embodiment is directed to a liquid pod comprising a liquid composition comprising at least two of a Solvent A, a Solvent B, an Active, a Modifier, and an Adjuvant, wherein the water treatment liquid composition is disposed within a packet comprising a water-soluble polymer film.

In one aspect, Solvent A is a solvent that does not dissolve the water-soluble film.

Examples of suitable solvents of "Solvent A" include, but are not limited to, acetone, acetonitrile, an ethoxylated alcohol, an aromatic hydrocarbon (e.g., methyl-benzene (toluene), a di-methyl benzene (e.g., o-xylene, m-xylene, p-xylene, or mixtures thereof), ethyl-benzene, etc.), bis(2-methoxyethyl)ether (diglyme), a C1-C10 alcohol, including linear alcohol (e.g., methanol, ethanol, etc.), branched (e.g., isopropanol, isobutanol, t-butanol, etc.), a secondary alcohol (e.g., sec-propanol, sec-butanol, etc.), a C5-C18 hydrocarbon, including a linear C5-C18 hydrocarbon (e.g., pentane, hexane, etc.), a branched C5-C18 hydrocarbon (e.g., 2-methyl-pentane, 2-methyl-hexane, etc.), a C5-C18 cyclic hydrocarbon (e.g., cyclohexane, cycloheptane, etc.), a cyclic ether (e.g., tetrahydrofuran (THF), 1,4-dioxane, etc.) dimethoxyethane (glyme), dimethylacetamide (DMA), dimethylformamide (DMF), dimethylsulfoxide (DMSO), dipropylene glycol, D-limonene, essential oil, ethyl butyrate, a halogenated hydrocarbon (e.g., chloroform, methylene chloride, 1,2-dichloroethane, trichloroethane, trichlorethylene, etc.), hexamethylphosphoramide (HMPA), hexamethylphosphorus triamide (HMPT), methyl tert-butyl ether (MTBE), nitromethane, N-methyl-2-pyrrolidone (NMP), petroleum ether/ligroine, phenol, pyridine, terpene, tetraethylene glycol dimethyl ether (tetraglyme), trimethylamine, and a combination thereof.

Generally, the amount of Solvent A may range from about 0 to 90% by weight of the composition. A liquid composition comprising 0% by weight of Solvent A means that the liquid composition does not contain Solvent A.

In another aspect, Solvent B is a solvent capable of dissolving the water-soluble film.

Examples of suitable solvents of "Solvent B" include, but are not limited to, propylene glycol, water, iso-propyl alcohol, ethanol, 2-butoxyethanol (e.g., butyl cellosolve), hexylene glycol, glycerin, ethylene glycol ether, 1-propanol, lactic acid, acetic acid, diethylene glycol, ethylene glycol, glycolic acid, and a combination thereof.

Generally, the amount of Solvent B may range from about 0.1 to 75% by weight of the liquid composition.

In another aspect, the Active is a clarifier, a sanitizer, a disinfectant, a pH adjuster, an enzyme (to ameliorate the effects of oil, dirt, organic contaminants, and the like), an algaecide, or a combination thereof.

Examples of suitable agent of "Active" include, but are not limited to, polydiallyldimethylammonium chloride (or PDADMAC), a hydrophilic cationic co-polymer (e.g., Noverite® 302), sodium hexametaphosphate (or SHMP), a quaternary ammonium chloride (i.e., Quat) surfactant, a chitosan, an algaecide, lanthanum chloride, sodium hypochlorite, cyanuric acid, a copper salt, a dichloroisocyanuric acid (DCCA), a trichloroisocyanuric acid (TCCA), a poly aluminum chloride, an aluminum chlorohydrate, an aluminum Chloride, an alum, a polyacrylate, a poly amines, ethylenediamine tetraacetic acid (EDTA), a sodium bisulfate, a cetyl alcohol, a polyquaternium WSCP (e.g., poly [oxyethylene(dimethyliminio) ethylene-(dimethyliminio) ethylene dichloride), NaOH, HCl, calcium chloride, an enzyme, sodium bicarbonate, sodium carbonate, and a combination thereof.

Generally, the amount of Active may range from about 0.1 to 90% by weight of the composition. Generally, the lower limit is determined by the volume of the recirculating water to be treated. For example, a liquid composition comprised of 4% Active may be used to treat 10,000 gallons of a recirculating water. Alternatively, a liquid composition comprised of 2% active may be used to treat 10,000 gallons of a recirculating water, but two pods may be necessary. Thus, pool volume, operator satisfaction, among other things, may be a determinant in the amount of Active in the liquid composition.

Examples of a suitable "Modifier" include, but are not limited to, diacetone alcohol (DAA), 2-isopropoxy-ethanol, a salt, acetone, methyl ethyl ketone (MEK), methyl isobutyl ketone (MIBK), ethyl acetate, a polymer (e.g., PEG, PEO, a cellulose (e.g., a hydroxyethyl cellulose, a hydroxypropyl cellulose, etc.), and a combination thereof.

Generally, the amount of Modifier may range from about 0 to 75% by weight of the composition. A liquid composition comprising 0% by weight of Modifier means that the composition does not contain Modifier. Certain Modifiers may be used to effect the density of the liquid composition, and thus, the density of the liquid pod. Certain Modifiers may be used to effect the flashpoint of the liquid composition.

Examples of suitable "Adjuvant" include, but are not limited to, a dye, a fragrance, a visual effect agent (e.g., a pearlescent pigment, glitter, etc.), and a combination thereof.

Generally, the amount of Adjuvant may range from about 0 to 75% by weight of the composition. A liquid composition comprising 0% by weight of Adjuvant means that the composition does not contain Adjuvant. For instance, it is contemplated that a liquid composition may not include a dye or a fragrance. Certain Adjuvants may be used to effect the density of the liquid composition, and thus, the density of the liquid pod. Certain Adjuvants may be used to effect the flashpoint of the liquid composition.

The water-soluble polymer film may comprise a composition comprising a polymer, and, optionally, an additive. Examples of a polymer include, but are not limited to, a polyacrylic acid or a copolymer thereof, a polyacrylamide (PAM) or a copolymer thereof, a polyvinyl alcohol (PVOH), a polyethylene glycol (PEG), a polyamine, a polyethyleneimine, a polyvinylpyrrolidone (PVP) or a copolymer thereof, a cellulose or derivative thereof, and the like. Commercially available water-soluble polymer films include, but are not limited to, M7031, M8310, M8630, and M8900 (manufactured by MonoSol), as well as STR 76 and SMT 76 (manufactured by Sekisui).

In an aspect of the first embodiment, the water-soluble polymer film has a thickness of about 1 to about 5 mil. In another aspect, the water-soluble polymer film has a thickness of about 2 mil to about 3 mil. In yet another aspect, the water-soluble polymer film as a thickness of about 2 mil or about 3 mil.

It is desirable that the liquid pod floats or sinks in recirculating water. A liquid pod that is capable of sinking may be desirable because an operator may apply the liquid pod to the bottom of the recirculating water system to treat, for example, a stain. A liquid pod that is capable of floating may be desirable because an operator may deliver a clarifier, a sequesterant, and the like, so that the material is dispersed throughout the pool rapidly.

Accordingly, another aspect of the first embodiment, the liquid pod has a density that permits the liquid pod to sink in recirculating water. In a particular aspect, the liquid composition (and the liquid pod) has a density greater than about 1.0 g/mL or about 1.3 g/mL. In this situation, the liquid pod is capable of sinking in the recirculating water.

In another aspect of the first embodiment, the liquid composition has a density less than the density of recirculating water. In a particular aspect, the liquid composition (and the liquid pod) has a density less than about 1.0 g/mL or about 0.9 g/mL. In this situation, the liquid pod is capable of floating on the surface of the recirculating water.

In another aspect of the first embodiment, the liquid composition has a viscosity of at least about 200 centipoise ("cP") at about 22° C. In an alternative aspect of the first embodiment, the liquid composition has a viscosity of at least about 250 cP at about 22° C. The viscosity of the liquid composition is important for rapid manufacture of the liquid pods. If the viscosity of the liquid composition is too low, then the pods do not seal well. If the viscosity of the liquid composition is too high, dispensing the liquid composition may be challenging because the flow rates are too low. In another aspect of the first embodiment, the liquid composition has a viscosity of not more than about 10,000 cP at about 22° C.

In another aspect of the first embodiment, the liquid composition comprises: 40% water and 60% SHMP. Unless specifically stated otherwise, %-values relate to % w/w. It was surprising discovered that a liquid composition comprising 40% water and 60% SHMP does not dissolve a water-soluble polymer film.

In another aspect of the first embodiment, the liquid composition comprises 24% DAA, 24% ethylene glycol monoisopropyl ether; 32.6% propylene glycol; 15.4% dipropylene glycol, and 4% PDADMAC.

In another aspect of the first embodiment, the liquid composition comprises 48% DAA; 32.6% propylene glycol; 15.4% dipropylene glycol, and 4% PDADMAC.

Another aspect of the first embodiment comprises adding the liquid pod to a recirculating water system. Examples of a recirculating water system include, but are not limited to, a swimming pool, a jacuzzi, a spa, a splash pad, a water feature, an artificial pond, and the like. In one aspect, the recirculating water system may be treated or untreated.

Another aspect of the first embodiment comprises manufacturing the liquid pod by known methods.

It may be understood from the embodiments described herein that the "comprising" expression "comprising" may be replaced, where appropriate, by the "consisting of" expression.

The Examples described below are not meant to be limiting of the subject matter claimed herein.

EXAMPLES

Examples of liquid compositions include:
60% SHMP; 40% Water (an example of high ionic strength liquid composition that prevents dissolution of the water-soluble film);
24% DAA; 24% Ethylene Glycol Monoisopropyl Ether; 32.6% Propylene Glycol; 15.4% Dipropylene Glycol, 4% Poly DADMAC; and
48% DAA 32.6% Propylene Glycol; 15.4% Dipropylene Glycol, 4% Poly DADMAC.

Approximately 7 mLs of an exemplary liquid composition was applied to a pre sealed 3-sided pod. The 4th side (non-sealed side) was rolled closed using a small wooden dowel and allowed to hang at ambient room temperature conditions for 72 hours. Films able to contain the material inside for more than 72 hrs were considered "passing". To date, each of the above-mentioned liquid compositions showed evidence of film/product compatibility.

Selected ingredients are chosen based on desired physical characteristics of liquid pod in the recirculating water (i.e., sink/float) and/or other manufacturing characteristics (such as viscosity of at least 250 cps).

The liquid pods may be manufactured by known methods. One example includes: (i) dispensing a fixed volume of the liquid composition into a pre-sealed pod, (ii) optionally, removing air bubbles, and (iii) sealing the pod by heat or other means.

The liquid pods described herein exhibit the following attractive features.

1) The tolerance of the film to the solution contained within can be controlled by blending a solvent that does not dissolve the film with a solvent that does dissolve the film.

2) The dissolution/solubility of the desired chemical to be delivered can be controlled by blending solvents that do/do not dissolve the desired chemical.

3) Selection of solvents from points 1 and 2 above lead to a solution of the desired chemical to be delivered that does not dissolve the water soluble film.

4) Addition of other materials, another solvent, dye, salt, fragrances, surfactants, etc. can change the flashpoint/density/viscosity of the solution.

5) The viscosity of the solution is important for rapid manufacture of water soluble pods. Too low and the pods do not seal well. Too high and the run rates are too low.

6) For certain applications, it is desirable that the pod sink/remain in place for a time, such as for treating stains, etc.

7) For certain applications, it is desirable that the pod floats, such as delivery of clarifiers, sequesterants, etc. so that the material is dispersed throughout the pool rapidly.

8) Water soluble pods described in 1-7 above are small enough to be dosed by hand but concentrated enough to treat a variety of recirculating water systems (e.g., a recirculating water system having a volume of at least about 150 gallons).

9) It was discovered that high ionic strength aqueous solutions are compatible with certain water soluble films.

Information disclosed in the references cited herein is incorporated by reference in its entirety. In the event that information incorporated by reference conflicts with the meaning of a term or an expression disclosed herein, the meaning of the term or the expression disclosed herein controls.

The invention claimed is:

1. A liquid pod for recreational water treatment comprising a liquid composition disposed within a packet comprising a water-soluble polymer film;
   wherein the liquid composition comprises:
   (i) 40% water and 60% sodium hexametaphosphate by weight;
   (ii) 24% diacetone alcohol, 24% ethylene glycol monoisopropyl ether, 32.6% propylene glycol, 15.4% dipropylene glycol, and 4% polydiallyldimethylammonium chloride; or)
   (iii) 48% diacetone alcohol, 32.6% propylene glycol, 15.4% dipropylene glycol, and 4% polydiallyldimethylammonium chloride.

2. The liquid pod of claim 1, wherein the water-soluble polymer film comprises a composition comprising a polymer, and, optionally, an additive.

3. The liquid pod of claim 1, wherein the water-soluble polymer film comprises a polyacrylic acid, a polyacrylic acid copolymer, a polyacrylamide, a polyacrylamide copolymer, a polyvinyl alcohol, a polyethylene glycol, a polyamine, a polyethyleneimine, a polyvinylpyrrolidone, a polyvinylpyrrolidone copolymer thereof, a cellulose, a cellulose derivative, or a combination thereof.

4. The liquid pod of claim 1, wherein the water-soluble polymer film has a thickness of about 1 to about 5 mil.

5. The liquid pod of claim 1, wherein the water-soluble polymer film as a thickness of about 2 mil or about 3 mil.

6. The liquid pod of claim 1, wherein the liquid pod comprises liquid composition (i) and has a density greater than the density of recirculating water.

7. The liquid pod of claim 1, wherein the liquid pod comprises liquid composition (ii) or liquid composition (iii) and has a density less than the density of recirculating water.

8. The liquid pod of claim 1, wherein the liquid composition has a viscosity of at least about 200 cP.

9. A method for treating a recirculating water system, which comprises adding the liquid pod of claim 1 to the recirculating water system.

\* \* \* \* \*